(No Model.)

L. THEIS.
HARROW.

No. 324,896. Patented Aug. 25, 1885.

Witnesses.
Thos. H. Hutchins
Wm. J. Hutchins

Inventor.
Leonard Theis

UNITED STATES PATENT OFFICE.

LEONARD THEIS, OF CABERY, ILLINOIS.

HARROW.

SPECIFICATION forming part of Letters Patent No. 324,896, dated August 25, 1885.

Application filed April 9, 1885. (No model.)

*To all whom it may concern:*

Be it known that I, LEONARD THEIS, a citizen of the United States of America, residing at Cabery, in the county of Ford and State of Illinois, have invented certain new and useful Improvements in Harrows, of which the following is a specification, reference being had therein to the accompanying drawings.

Figure 1:
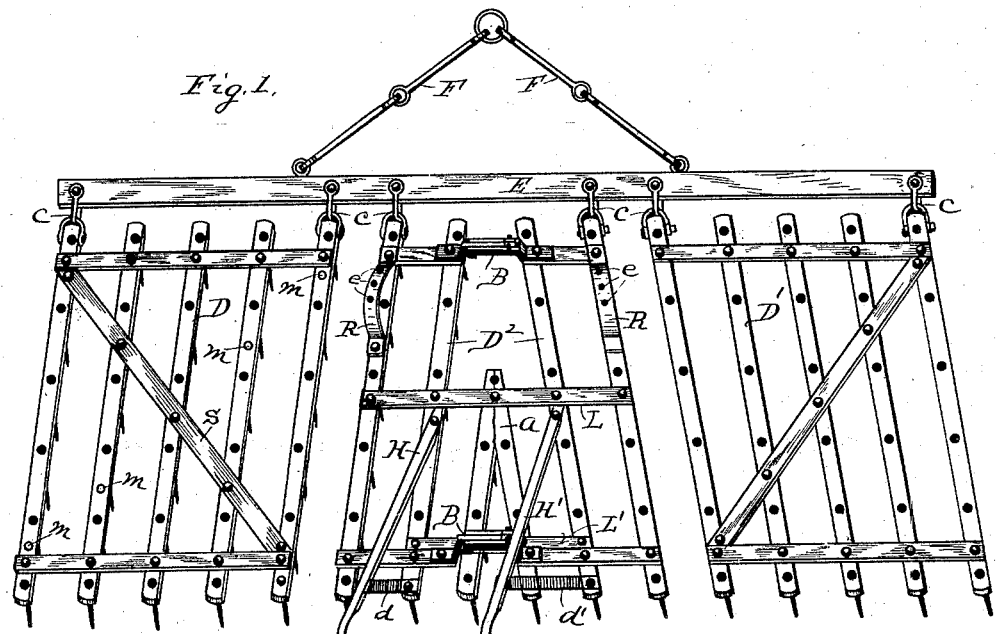
Figure 2:
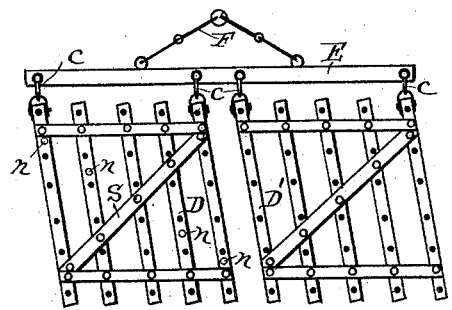
Figure 3:
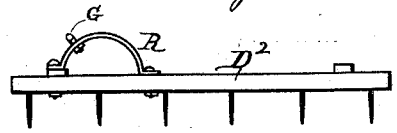
Figure 4:
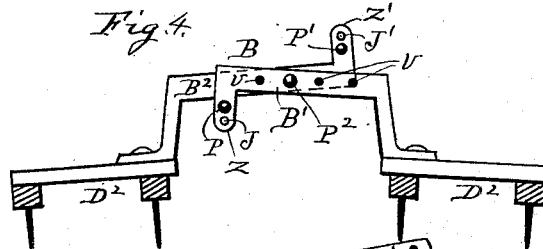
Figure 5:
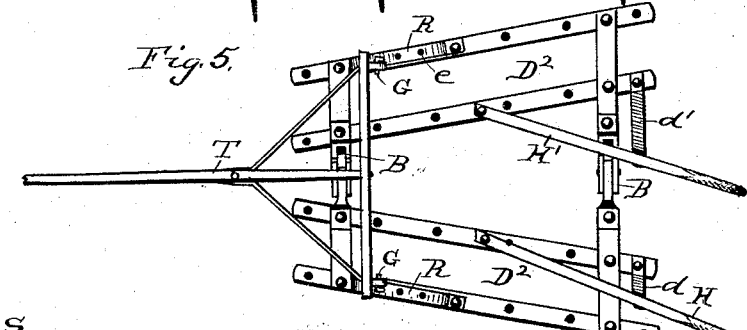

Figure 1 is a perspective view of the harrow arranged to be used by three horses and having three independent sections attached to a long evener. Fig. 2 is a top plan view of the harrow arranged to be used by two horses by using but the two outer sections of the harrow shown in Fig. 1. Fig. 3 is a side view of one of the side beams of the harrow, used as the central section in Fig. 1. Fig. 4 is a cross-section of the harrow, used as the central section in Fig. 1, at the side of a pair of its cross-beams. Fig. 5 is a top plan view of the harrow used as the central section in Fig. 1, and having a tongue attached thereto, showing it as it would appear when used independently to work the rows of small growing corn.

This invention relates to certain improvements in harrows, which improvements are fully set forth and explained in the following specification and claim.

Referring to the drawings, Fig. 1 represents the harrow, composed of the three sections D, D', and D², all clevised to the long evener E, and designed to be drawn by three horses, attached to it by the chain F. The section D² may be removed and the two sections D and D' used together, as shown in Fig 2, and drawn by two horses. When the three are used together, as shown in Fig. 1, the rear ends of sections D and D' are arranged to be farther apart than their front ends, to admit the central section, D², which is wider at its rear end than at its front end. When sections D and D' are used together, it is necessary that section D should be skewed in the same direction as section D', as shown in Fig. 2. This is accomplished by unbolting brace-beam S from the bolt-holes n, (see Fig. 2,) and removing it from the position shown in Fig. 1, and after having skewed the harrow-frame in the same direction as section D', as shown in Fig. 2, the said brace-beam is placed on oppositely from that shown in said figure, and secured by passing bolts through it and the opposite row of holes m. (Shown in Fig. 1.) The harrow is then in the form shown in Fig. 2, ready for use as a two-horse harrow. The middle harrow, D², may be removed from between the other two and used independently in the form shown in Fig. 5. In such case the middle beams, a, and cross-beams L L, to which they attach, may be removed, if desired, to leave it in the form shown in said figure. The two main side beams of harrow D² are connected by means of a pair of upright jointed connections, B B, a side view of one of which is shown in Fig. 4. These connections are formed of the arms B' B², bolted to the harrow, and united with each other by means of the bolt P², forming a kind of hinge-connection, so as to permit the two parts of the harrow to adapt themselves to the contour of the ground, independently from each other on either side of a row of corn within certain limits. These arms B' B² are provided with the horizontal row of holes v, for the purpose of regulating the distance apart of the two parts of the harrow, and also with a vertical row of holes, J J', located in their elbows z z' for the reception of the pins P P', for the purpose of regulating the pitch or inclination of the two parts of the harrow in either direction. The two outer beams of the harrow D² are each provided with a segmental perforated draft-standard, R, located near their front ends, as shown in Figs. 1, 3, and 5, and firmly bolted thereto for the purpose of providing means for attaching an ordinary wagon-tongue to the harrow, as shown at T in Fig. 5.

The row of holes e furnish means for attaching the tongue T at any desired height on said standard, to raise it above the row, and for attaching it at different distances from the front end of the harrow, which is an advantage at times.

Each part of the harrow has a handle, (shown at H H' in Figs. 1 and 5,) secured thereto by braces d d', for the purpose of permitting the operator to manage and operate it.

I am aware that it is common to hinge a pair of harrows together, but not in the manner shown, by means of hinges bent upward to stride the row, and arranged to be opened and closed within certain limits by means of the pins passing through their rows of holes, as shown.

Having thus described my invention, what I claim as new, and desire to secure by Letters Patent, is as follows, to wit:

The harrow D², having the upwardly bent or curved arms B' B², provided with the perforations v and J J', and pins P P', curved perforated draft-standards R, tongue T, removable beams a, and handles H H', all combined and arranged as and for the purpose set forth.

LEONARD THEIS.

Witnesses:
 JOSEPH SMEATON,
 JOHN DITTRICH.